US008234802B2

(12) United States Patent
Volpe

(10) Patent No.: US 8,234,802 B2
(45) Date of Patent: Aug. 7, 2012

(54) MOUNTABLE DISPLAY FOR TEMPORARY VEHICLE TAG

(76) Inventor: Paul M. Volpe, Stow, OH (US)

( * ) Notice: Subject to any disclaimer, the term of this patent is extended or adjusted under 35 U.S.C. 154(b) by 0 days.

(21) Appl. No.: 12/910,294

(22) Filed: Oct. 22, 2010

(65) Prior Publication Data

US 2012/0096748 A1    Apr. 26, 2012

(51) Int. Cl.
 *G09F 7/00*    (2006.01)
(52) U.S. Cl. .............................. 40/209; 40/661
(58) Field of Classification Search .................. 40/200, 40/209, 661
 See application file for complete search history.

(56) References Cited

U.S. PATENT DOCUMENTS

| | | | | |
|---|---|---|---|---|
| 1,683,645 A | * | 9/1928 | Abbey | 40/651 |
| 5,149,571 A | * | 9/1992 | Croell | 428/41.7 |
| 6,578,304 B1 | * | 6/2003 | Lytle | 40/711 |
| 2003/0160090 A1 | * | 8/2003 | MacEwen et al. | 229/68.1 |
| 2003/0196362 A1 | * | 10/2003 | Harwell | 40/661 |
| 2009/0100725 A1 | * | 4/2009 | Freeman | 40/209 |
| 2009/0193699 A1 | * | 8/2009 | Benedict et al. | 40/606.12 |

* cited by examiner

*Primary Examiner* — Gary Hoge
(74) *Attorney, Agent, or Firm* — Renner, Kenner, Greive, Bobak, Taylor & Weber

(57) ABSTRACT

A mountable display for a temporary vehicle tag is provided. The display includes a transparent envelope adapted to receive a paper tag overlayed upon a reinforcement board or card. The envelope may have an adhesively coated flap extending from an open end thereof, the flap being adapted to pass around the envelope and seal to the back thereof, such that the temporary tag is received and maintained in a transparent sealed envelope. Screws or bolts pass through the envelope and through designated areas of the reinforced tag, for securing engagement with an insert received by a panel of the vehicle. The bolts or screws make securing engagement of the envelope and tag to the vehicle by sandwiching the combination of the envelope and reinforced tag between the head of the bolt or screw and the vehicle panel.

9 Claims, 2 Drawing Sheets

MOUNTABLE DISPLAY FOR TEMPORARY VEHICLE TAG

TECHNICAL FIELD

The invention herein resides in the art of display devices and, more particularly, to such devices that provide a closure sealed against the ambient. Specifically, the invention relates to a mountable display receptacle for temporary vehicle tags.

BACKGROUND OF THE INVENTION

In most venues, vehicles commonly require license tags or "plates" indicating that the appropriate road use taxes or fees for the vehicle have been paid. Typically, these license plates are made of painted metal, to ensure their longevity.

While vehicle license plates are typically issued yearly, for any of numerous reasons license tags for much shorter periods are required. For such purposes, temporary tags are issued for periods such as 10-30 days, and are typically used for an initial period following the purchase of a vehicle. For years, these temporary tags have been of a card stock which is relatively rigid and durable, and suited to last for the period of issuance. These sturdy card stock temporary tags were adapted to be fixed to the vehicle by mounting screws or bolts in the same location intended for the annual license plate.

Recently, as a part of cost cutting efforts, temporary tags in many venues have been reduced from a heavy card stock to thin paper, having a thickness of only several mils. However, these thin paper temporary tags are not given to mounting as are the annual plates, nor are they durable or impervious to changing weather conditions. Accordingly, these thin paper temporary tags have typically been taped to or otherwise displayed in the rear window of the vehicle.

There is a need in the art for a study, reliable, durable and weather impervious receptacle whereby temporary vehicle tags may be displayed on the vehicle in the same location where the permanent license plate would otherwise be affixed.

DISCLOSURE OF INVENTION

In light of the foregoing, a first aspect of an embodiment of the invention is the provision of a mountable display for a temporary vehicle tag that provides strength, utility, and durability to an issued thin paper tag.

Another aspect of an embodiment of the invention is the provision of a mountable display for a temporary vehicle tag which may be readily affixed to the vehicle at the location normally receiving the annual or permanent license plate.

Still a further aspect of an embodiment of the invention is the provision of a mountable display for a temporary vehicle tag that sealingly receives a paper tag overlayed on a substantially rigid substrate and maintained in a transparent plastic envelope, sealed against the environment.

Still an additional aspect of an embodiment of the invention is the provision of a mountable display for a temporary vehicle bag that is readily constructed from state of the art materials and which is cost effective in manufacture and implementation.

The foregoing and other aspects of the invention that will become apparent as the detailed description proceeds are achieved by a mounting receptacle for a temporary vehicle tag, comprising: a reinforcement board; a transparent envelope for receiving said reinforcement board overlayed by the temporary vehicle tag, said transparent envelope being permanently sealed about three edges thereof and being adapted for selective sealing at a fourth edge thereof, following receipt of said reinforcement board overlayed by the temporary vehicle tag.

DESCRIPTION OF DRAWINGS

For a complete understanding of the various aspects and features of embodiments of the invention, reference should be made to the following detailed description and accompanying drawings wherein.

BEST MODE FOR CARRYING OUT THE INVENTION

Figure 1:
FIG. 1 is a front elevational view a common temporary tag.

Referring now the drawings and more particularly FIG. 1, it can be seen that a temporary license tag as issued in many venues is designated generally by the numeral 10. The temporary tag 10 is of paper construction, typically on the order of 2-5 mils. The temporary tag 10 includes a plurality of indicia, including an identification of state of registration, identified at 12, the fact that the tag is a temporary tag is indicated at 14, an appropriate identification number as at 16, and an expiration date, as presented at 18. The temporary tag 10 includes areas designated for the passage of securing screws or bolts. These areas 20 are indicated as by printed indicia, cut slits, or holes passing through the temporary tag 10. The spacing between the areas 20 is that spacing of a standard tag, and would overlay the receptacles for screws or bolts common on vehicles for receiving permanent license plates.

Figure 2:
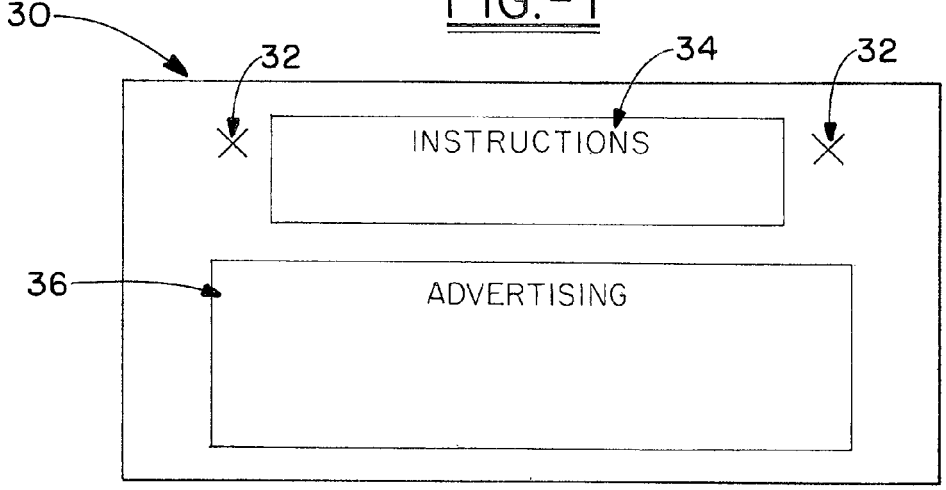
FIG. 2 is a front elevational view of a reinforcement board or card used in accordance with embodiments of the invention.

With reference now to FIG. 2, it can be seen that a reinforcement board or card used within an embodiment of the invention is designated generally by the numeral 30. The board or card 30 is substantially the same dimension as the temporary tag 10 but is substantially thicker and sturdier, such as a super calendered card stock or the like. A paper board, having a typical thickness on the order of 8-40 mils or more may be employed for this purpose. The reinforcement board or card 30 is provided with designated areas 32 for receiving securing screws or bolts. The areas 32 are in registration with areas 20 of the temporary tag 10, when the tag 10 is overlayed on the card 30. The areas 32 may simply be printed indicia, but are preferably cut slits or holes, adapted for receiving securing screws or bolts. The card 30 may include an area or region 34 for printed instructions, and another area or space 36 for advertising or the like. The instructions at 34 would inform the user how to use the structures of embodiments of the invention for securing, protecting and mounting a temporary tag 10. The advertising at 36 would typically be regionalized for the venue of interest.

Figure 3:
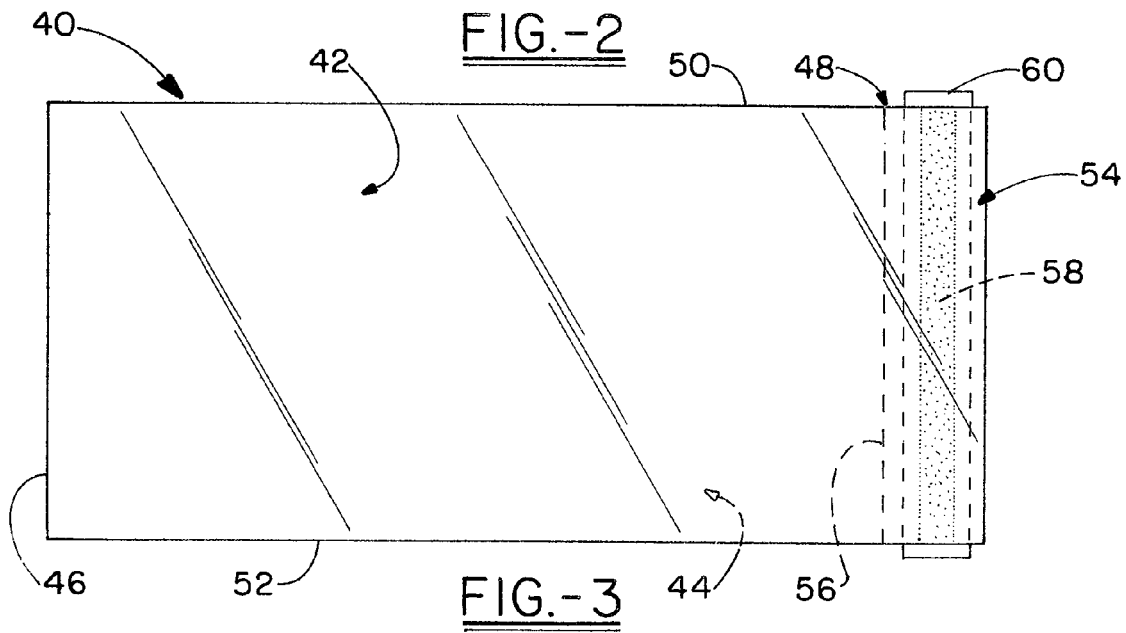
FIG. 3 is a front perspective view of a transparent plastic envelope employed with embodiments of the invention.

With reference now to FIG. 3, it can be seen that an envelope 40 of clear or highly transparent plastic film such as polyethylene is provided. The envelope 40 would typically be on the order of 1-4 mils in thickness and include an ultraviolet inhibitor. The envelope 40 has a front side 42 and an opposite back side 44. The front and back sides 42, 44 are sealed together at an end 46 and provide a continuous opening at the end 48. The front and back sides 42, 44 are sealed along the length of the sealed top edge 50 and sealed bottom edge 52. These seals define an open ended envelope having an interior dimensioned just slightly greater than the temporary tag 10 overlaying the reinforcement card 30. Accordingly, the overlay combination may be easily and readily received within the envelope 40.

The envelope 40 is provided with a sealing flap 54 which comprises an extension of the front side 42 beyond the open end 48. The sealing edge 50 is foldable about the end line 56, shown in phantom in FIG. 4. This bending of the sealing flap 54 allows it to be sealed to the back side 44 of the envelope 40 after the temporary tag 10 and reinforcement board 30 are placed within the envelope 40. This sealing may be effected by simply attaching an adhesive tape over the flap 54 and back side 44 or, alternatively, a layer of pressure sensitive adhesive 58 may be provided on a back side of the sealing flap 54 to effect this sealing engagement. In this embodiment, prior to use a release liner 60, such as silicone coated paper or the like, is maintained upon the pressure sensitive adhesive 58 and is removed just before the flap 54 is folded about the line 56 such that the pressure sensitive adhesive layer 58 may be secured to the back side 44.

Figure 4:
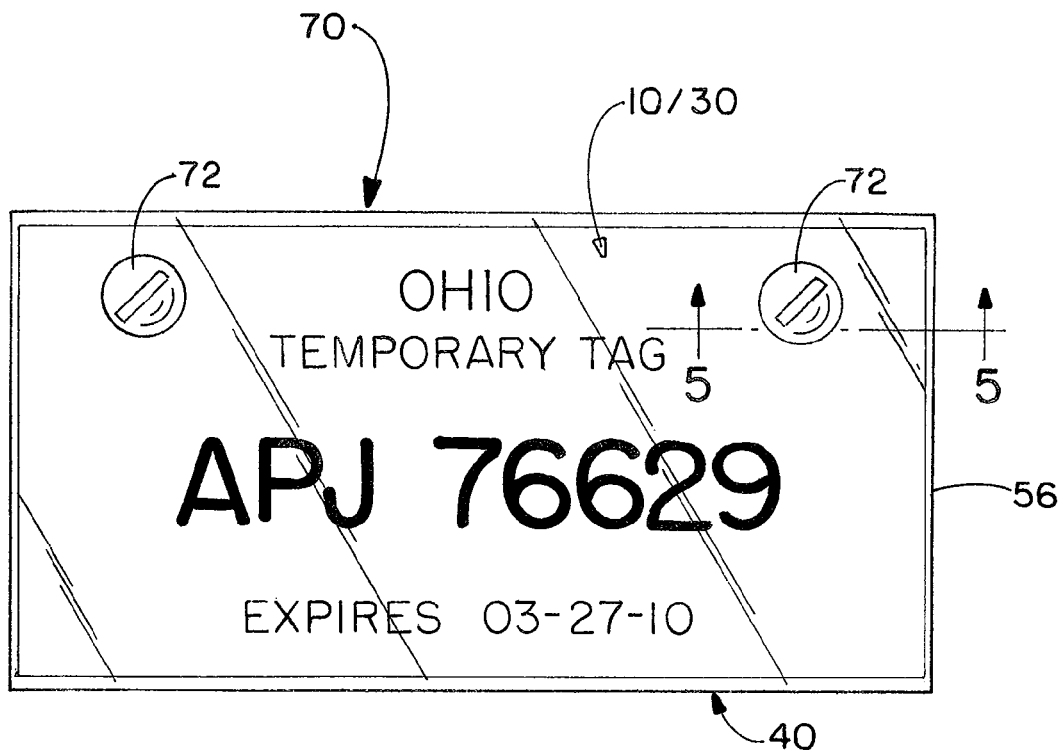
FIG. 4 is a front elevational view of a temporary tag mounted on a reinforcement board or card and received within a transparent plastic envelope and sealed therein in accordance with an embodiment of the invention.

With reference to FIG. 4, it can be seen that the temporary tag 10, overlaying the reinforcement card stock 30 is sealed within the envelope 40 and mounted to a vehicle, the combination being designated generally by the numeral 70. The mounting is achieved by appropriate screws or bolts 72 received within threaded inserts or the like within the vehicle itself.

Figure 5:
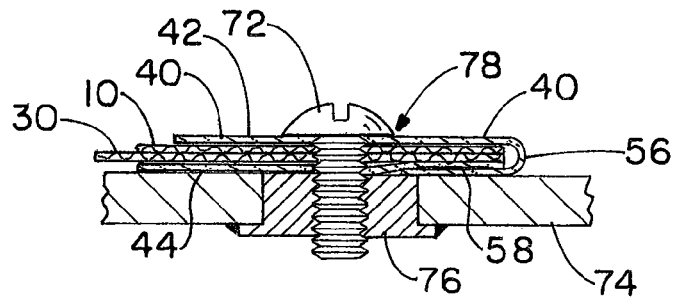
FIG. 5 is an enlarged partial cross sectional view of the embodiment of FIG. 4 as may be taken along the line 5-5.

Referring now to FIG. 5, an appreciation can be obtained of the securing engagement of the mountable display for temporary vehicle tags according to an embodiment of the invention. As shown, a screw 72 passes through the openings or indicia 20, 32 of the temporary tag 10 and reinforcing card 30 and into a screw or bolt receiving insert 76 within a vehicle panel 74. A head of the screw 72 seals against a front side 42 of the envelope 40 and urges the overlying sealing flap 54 into engagement against the vehicle panel 74. Accordingly, a seal is developed by the sandwiching the envelope 40 and its contents between the head of the screw or bolt 72 and the vehicle panel 74, ensuring that the apertures through which the screws or bolts 72 pass are rendered impervious to the ambient. It will be appreciated that according to an embodiment of the invention, the screws or bolts 72 are simply pierced through the plastic film of the front and back sides 42, 44 at areas in registration with the openings or indicia 20, 32, the resulting pierced holes being sealed by the sandwiching just discussed.

As shown in FIG. 5, the flap 54, comprising an extension of the front side 42 of the envelope 40, extends around the edge of the envelope and seals to the backside 44, thus securing and retaining the temporary tag 10 and reinforcing card 30 therein. This sealing is achieved by adhesive tape or adhesive layer 58. The result of the embodiments of the invention presented above is the presentation of a temporary vehicle tag in a transparent envelope, which has been reinforced by a card 30 or the like such that it can last in an environment of changing weather over a reasonable course of time. The combination just described provides a display for the temporary tag that is sturdy and durable, easy to view, easy to install and remove, and which is economic in use. Indeed, by providing advertising space on the card stock 30, the mountable display for temporary vehicle tags may actually be produced to the end user at no cost or for a nominal fee.

Thus it can be seen that the various aspects of embodiments of the invention have been achieved by the structures presented above. While in accordance with the patent statutes only the best mode and preferred embodiments of the invention have been presented and described in detail, the invention is not limited thereto or thereby. Accordingly, for an appreciation of the true scope and breadth of the invention reference should be made to the following claims.

What is claimed is:

1. A mounting receptacle for a temporary vehicle tag, comprising:
    a reinforcement board;
    a transparent envelope for receiving said reinforcement board overlayed by the temporary vehicle tag, said transparent envelope being permanently sealed about three edges thereof and being adapted for selective sealing at a fourth edge thereof, following receipt of said reinforcement board overlayed by the temporary vehicle tag; and
    wherein said reinforcement board is characterized by areas designated for receipt of securing screws or bolts, and further comprising fasteners having heads thereon, said fasteners being adapted for securing to a vehicle said transparent envelope containing the temporary vehicle tag overlayed on said reinforcement board and sealed therein by said flap, said fasteners adapted for sealing said envelope under said heads.

2. The mounting receptacle for a temporary vehicle tag according to claim 1, wherein said transparent envelope has a flap extending from said fourth edge thereof, said flap effecting said selective sealing.

3. The mounting receptacle for a temporary vehicle tag according to claim 2, wherein said flap has a pressure sensitive adhesive layer thereon.

4. The mounting receptacle for a temporary vehicle tag according to claim 3, further comprising a release liner removably covering said pressure sensitive adhesive layer.

5. The mounting receptacle for a temporary vehicle tag according to claim 4, wherein said flap comprises an extension of a front side of said envelope and is adapted by said pressure sensitive adhesive to make securing and sealing engagement with a back side of said envelope.

6. The mounting receptacle for a temporary vehicle tag according to claim 1, wherein said reinforcement board is of substantially a same geometric size and configuration as the temporary vehicle tag.

7. The mounting receptacle for a temporary vehicle tag according to claim 6, wherein said areas comprise openings passing through said reinforcement board.

8. The mounting receptacle for a temporary vehicle tag according to claim 7, wherein said reinforcement board provides thickness, strength and rigidity to the temporary vehicle tag.

9. The mounting receptacle for a temporary vehicle tag according to claim 8, wherein said transparent envelope is made of a material having an ultra-violet inhibitor.

* * * * *